(12) United States Patent
Shirataki et al.

(10) Patent No.: US 8,397,888 B2
(45) Date of Patent: *Mar. 19, 2013

(54) ONE-WAY CLUTCH OF ROLLER TYPE

(75) Inventors: Hirobumi Shirataki, Fukuroi (JP); Tomoharu Ando, Fukuroi (JP); Yasuhide Takasu, Fukuroi (JP); Shinya Okuma, Fukuroi (JP)

(73) Assignee: NSK-Warner K.K., Tokyo (JP)

( * ) Notice: Subject to any disclaimer, the term of this patent is extended or adjusted under 35 U.S.C. 154(b) by 370 days.

This patent is subject to a terminal disclaimer.

(21) Appl. No.: 12/606,849

(22) Filed: Oct. 27, 2009

(65) Prior Publication Data

US 2010/0108455 A1 May 6, 2010

(30) Foreign Application Priority Data

Oct. 30, 2008 (JP) .................................. 2008-279407

(51) Int. Cl.
*F16D 41/067* (2006.01)

(52) U.S. Cl. .................. 192/45.016; 192/42; 192/45.008

(58) Field of Classification Search .................... 192/45, 192/38, 82.84, 44, 45.019
See application file for complete search history.

(56) References Cited

U.S. PATENT DOCUMENTS

| | | | |
|---|---|---|---|
| 1,708,215 A | 4/1929 | Chryst | |
| 2,843,238 A | 7/1958 | Rozner | |
| 2,902,125 A | 9/1959 | House et al. | |
| 3,011,606 A * | 12/1961 | Ferris et al. ..................... | 192/45 |
| 3,166,169 A | 1/1965 | Wade et al. | |
| 3,190,417 A | 6/1965 | Bacon | |
| 3,547,238 A | 12/1970 | Harmon | |
| 3,656,591 A | 4/1972 | Marland et al. | |
| 3,718,212 A | 2/1973 | Havranek | |
| 4,724,940 A | 2/1988 | Lederman | |
| 4,932,508 A | 6/1990 | Lederman | |
| 4,986,402 A | 1/1991 | Neuwirth et al. | |
| 4,995,490 A | 2/1991 | Kanai | |
| 5,074,393 A | 12/1991 | Itomi | |
| 5,271,486 A | 12/1993 | Okamoto et al. | |
| 5,279,400 A | 1/1994 | Riggle et al. | |

(Continued)

FOREIGN PATENT DOCUMENTS

| | | |
|---|---|---|
| CN | 1592667 A | 3/2005 |
| DE | 29 28 587 A1 | 1/1981 |

(Continued)

OTHER PUBLICATIONS

Office Action in Japanese Patent Application No. 2008-279407, May 21, 2012.

(Continued)

*Primary Examiner* — Richard M. Lorence
*Assistant Examiner* — Lillian Nguyen
(74) *Attorney, Agent, or Firm* — Miles and Stockbridge P.C.

(57) ABSTRACT

The present invention provides a one-way clutch comprising an outer race, an inner race, a roller adapted to transmit torque between the outer race and the inner race, a cage having a window for holding the roller, a spring disposed in the pocket and adapted to bias the roller toward an engagement direction with respect to the cam surface, and a side plate provided at its inner diameter portion with spline grooves into which a crankshaft of an engine is fitted, and wherein the side plate is secured to the outer race by inserting rivets into through holes provided in the outer race and through holes provided in the side plate and by caulking the rivets.

6 Claims, 2 Drawing Sheets

U.S. PATENT DOCUMENTS

| | | | |
|---|---|---|---|
| 5,328,010 | A | 7/1994 | Lederman |
| 5,343,991 | A | 9/1994 | Premiski et al. |
| 5,647,800 | A | 7/1997 | Warnke et al. |
| 5,704,458 | A | 1/1998 | Neuwirth et al. |
| 5,842,548 | A | 12/1998 | Sato et al. |
| 5,941,355 | A | 8/1999 | Iga |
| 6,003,799 | A | 12/1999 | Jung |
| 6,374,974 | B1 | 4/2002 | Wake |
| 6,796,413 | B2 * | 9/2004 | Fukui et al. ............. 192/42 |
| 6,848,552 | B2 | 2/2005 | Miller |
| D586,832 | S | 2/2009 | Shirataki et al. |
| 7,740,118 | B2 | 6/2010 | Shirataki et al. |
| 8,002,096 | B2 | 8/2011 | Shirataki |
| 8,037,986 | B2 * | 10/2011 | Takasu ................. 192/45 |
| 8,042,671 | B2 | 10/2011 | Kinoshita |
| 8,162,114 | B2 | 4/2012 | Shirataki et al. |
| 2003/0085092 | A1 | 5/2003 | Fukui et al. |
| 2004/0139743 | A1 | 7/2004 | Sato |
| 2005/0034951 | A1 | 2/2005 | Takasu |
| 2007/0246318 | A1 | 10/2007 | Shirataki et al. |
| 2007/0251794 | A1 | 11/2007 | Shirataki et al. |
| 2008/0196995 | A1 | 8/2008 | Mikami et al. |
| 2009/0242346 | A1 | 10/2009 | Kinoshita |
| 2009/0277739 | A1 * | 11/2009 | Takasu ................. 192/45 |
| 2009/0301257 | A1 | 12/2009 | Shirataki et al. |
| 2010/0084239 | A1 | 4/2010 | Ando |
| 2010/0096235 | A1 | 4/2010 | Shirataki et al. |
| 2010/0096236 | A1 * | 4/2010 | Ando ................... 192/45 |
| 2010/0101910 | A1 | 4/2010 | Ando |
| 2010/0116611 | A1 | 5/2010 | Shirataki et al. |
| 2010/0213021 | A1 | 8/2010 | Shirataki |
| 2010/0258398 | A1 | 10/2010 | Shirataki et al. |
| 2010/0314211 | A1 | 12/2010 | Shirataki et al. |

FOREIGN PATENT DOCUMENTS

| | | |
|---|---|---|
| EP | 0 237 243 A1 | 9/1987 |
| JP | 05-044615 A | 2/1993 |
| JP | 08-061192 A | 3/1996 |
| JP | 10-009292 A | 1/1998 |
| JP | 2003-148518 A | 5/2003 |
| JP | 2003-172377 A | 6/2003 |
| JP | 2004-346951 A | 12/2004 |
| JP | 2005-172181 A | 6/2005 |
| JP | 2006-275219 A | 10/2006 |
| JP | 2007-064475 A | 3/2007 |
| JP | 2007-278426 A | 10/2007 |
| JP | 2008-138712 A | 6/2008 |
| JP | 2008-138723 A | 6/2008 |
| TW | 354820 | 3/1999 |
| TW | I264503 B | 10/2006 |
| TW | 200801364 A | 1/2008 |
| WO | WO 03/047809 A1 | 6/2003 |
| WO | WO 2008/047457 A1 | 4/2008 |

OTHER PUBLICATIONS

Office Action issued May 10, 2012, in U.S. Appl. No. 12/680,376.
Office Action issued Aug. 6, 2010 in Taiwan Patent Application No. 097110807.
Office Action issued May 21, 2012 in Japanese Patent Application No. 2008-267227.
Office Action issued Apr. 16, 2012 in Japanese Patent Application No. 2008-148984.
Office Action issued May 21, 2012 in Japanese Patent Application No. 2008-258675.
Office Action dated May 14, 2012 in Chinese Appln. No. CN 200880127624.2.

* cited by examiner

ONE-WAY CLUTCH OF ROLLER TYPE

This application claims the benefit of Japanese Patent Application No. 2008-279407, filed Oct. 30, 2008, which is hereby incorporated by reference herein in its entirety.

BACKGROUND OF THE INVENTION

1. Field of the Invention

The present invention relates to a one-way clutch of roller type used as a part such as a torque transmitting element or a back stopper in a driving apparatus of a motor vehicle, an industrial machine and the like, for example. More particularly, the present invention relates to a one-way clutch of roller type suitable to be used as a starter of a motor bike.

2. Related Background Art

In general, a one-way clutch of roller type is comprised of an outer race having at least one pocket provided at its inner periphery with a cam surface, an inner race disposed in concentric with the outer race and having an outer peripheral track surface, a roller disposed within the pocket and adapted to transmit torque between the outer peripheral track surface of the inner race and the inner peripheral cam surface of the outer race, and a spring contacted with an idle rotation side of the roller.

With this arrangement, in the one-way clutch, the inner race is designed so as to be rotated only in one direction with respect to the outer race by means of a cam mechanism constituted by the roller and the cam surface. That is to say, the inner race is designed so that it is idly rotated relative to the outer race in one direction, and on the other hand, it applies rotational torque to the outer race via the cam mechanism only in an opposite direction.

In some one-way clutches of roller type used as the starter of the motor bike, as disclosed in Japanese Patent Application Laid-open No. 5-044615 (1993), a side plate provided at its inner diameter portion with spline grooves with which a member such as a crankshaft of an engine is engaged is bolted to an outer race of the one-way clutch.

On the other hand, in order to enhance the performance of the one-way clutch, it has been proposed to lubricate the members. For example, the above-mentioned Japanese Patent Application Laid-open No. 5-044615 (1993) discloses an arrangement in which a one-way clutch is lubricated by oil. Further, some one-way clutches have been used under a dry condition without oil lubrication.

In the conventional one-way clutch of roller type used as the starter of the motor bike as disclosed in the above-mentioned Japanese Patent Application Laid-open No. 5-044615 (1993), it is feared that abrupt and excessive torque generated by the "kick-back" during the starting of the motor bike and/or erroneous engagement of the one-way clutch is applied to the one-way clutch through a crankshaft. Thus, it is necessary to strongly couple the side plate and the outer race by means of bolts or screws having reliable strength.

Accordingly, under a severe service condition that the motor bike is subjected to vibration, it is feared that the screw(S) is/are loosened, which will result in reduction in reliability of the one-way clutch.

Further, in order to prevent the screw from being loosened, it is necessary to fabricate means for preventing the screw from being loosened or to provide locking means such as lock-tight, which obstructs reduction in cost.

Further, since it is necessary to provide threaded holes in the outer race and the side plate and since the number of manufacturing steps is increased, there by increasing the cost.

Therefore, in the one-way clutch of roller type used as the starter of the motor bike having the side plate, it is desired to provide a one-way clutch of roller type in which reliability can be enhanced in comparison with conventional clutches and the cost can be reduced by decreasing the number of manufacturing steps.

SUMMARY OF THE INVENTION

Accordingly, an object of the present invention is to provide a one-way clutch of roller type used as a starter of a motor bike having a side plate in which reliability is enhanced in comparison with conventional clutches by tightening a side plate and an outer race by means of rivets and to realize reduction in cost by decreasing the number of manufacturing steps.

To achieve the above object, the present invention provides a one-way clutch of roller type comprising an outer race provided at its inner periphery with at least one pocket including a cam surface and having a stepped portion formed at an inner diameter side of one axial end face of the outer race and also having a plurality of holes passing through the outer race in an axial direction; an inner race spaced apart from the outer race toward a radial inner diameter side of the outer race and coaxially arranged for a relative rotational movement; a roller disposed in the pocket and adapted to transmit torque between the outer race and the inner race when engaged by the cam surface; a cage rotatable relative to the outer race and having a cylindrical portion with a window for holding the roller and a flange portion extending from the cylindrical portion in an outer diameter direction and fitted into the stepped portion of the outer race; a spring disposed in the pocket and adapted to bias the roller toward an engagement direction with respect to the cam surface; and a side plate provided at its inner diameter portion with spline grooved with which an input member is engaged and having a plurality of holes extending through the side plate in the axial direction and arranged at the same pitch as the holes of the outer race; and wherein the side plate is secured to the outer race by inserting rivets into the holes of the outer race and the holes of the side plate and by caulking the rivets.

Further, preferably, in the one-way clutch of roller type according to the present invention, the side plate is secured to an axial one end face of the outer race, and the other axial end face of the outer race is provided with openings disposed coaxially with the holes of the outer race and having diameters greater than diameters of the holes of the outer race.

Further, preferably, in the one-way clutch of roller type according to the present invention, the one-way clutch is used as a starter of a motor bike.

Further, preferably, in the one-way clutch of roller type according to the present invention, the window of the cage has a circumferential width smaller than a diameter of the roller.

Further, preferably, in the one-way clutch of roller type according to the present invention, the spring is disposed between the outer race and the roller.

Further, preferably, in the one-way clutch of roller type according to the present invention, the input member is a member associated with an engine.

In the one-way clutch of roller type according to the present invention, since the outer race and the side plate provided at its inner diameter portion with the spline grooves with which the crankshaft of the engine is engaged are strongly fastened to each other by the rivets, by a cam mechanism comprised of the roller, spring and cam surface and acting between the outer race and the inner race which is engaged by a housing of a starter motor, a power of the starter motor can be transmitted to the crankshaft of the engine.

Even if the abrupt and excessive torque generated by the "kick-back" during the starting of the motor bike and/or erroneous engagement of the one-way clutch is applied to the one-way clutch through the crankshaft, since the outer race and the side plate are strongly secured to each other by the rivets, there is no danger of generating any play between the outer race and the side plate.

In the one-way clutch of roller type according to the present invention, by using the caulking of the rivets, there is no danger of loosening of screws under a severe service condition that the motor bike is subjected to vibration, thereby further enhancing the reliability.

Further, in the one-way clutch of roller type according to the present invention, since the manufacturing steps such as a step for forming threaded holes, a step for tightening screws, a step for providing means for preventing the screws from being loosened can be omitted, the number of manufacturing steps can be reduced and, at the same time, the manufacturing time can be shortened, thereby reducing the cost.

Further, in the one-way clutch of roller type according to the present invention, by the cage including the window having the circumferential window width smaller than the diameter of the roller in the circumferential direction and passing through the cage in the radial direction but closed at both ends in the axial direction i.e. the window being enclosed at its four sides to define a substantially rectangular window into which the roller is seated and also including the flange portion provided at the axial one end portion of the pocket, the roller is prevented from being dislodged in the axial direction and in the inner diameter direction.

Further, by fitting the flange portion of the cage into the stepped portion provided at the inner diameter end face of the outer race and by securing the side plate to the end face of the outer race near the flange portion, the dislodgement of the cage is prevented.

Furthermore, by designing so that the cage can be rotated relative to the outer race, even when the circumferential window width of the cage is smaller than the diameter of the roller to prevent the dislodgement of the roller in the radial direction, since the cage does not obstruct the movement of the roller during the engaging operation of the one-way clutch and during the idle rotation, smooth engagement and idle rotation can be realized, and, regarding the movements of all rollers, the cage affords the synchronous action, thereby providing a one-way clutch of roller type having more excellent engaging reliability.

Accordingly, in the one-way clutch of roller type according to the present invention, since the engaging reliability is more enhanced by affecting the synchronous action upon the movements of all rollers by means of the cage, the frequency in which the abrupt and excessive torque due to the erroneous engagement is generated is reduced, with the result that, even when the rivet caulking is used in place of the screw tightening which was used as a method for tightening the side plate and the outer race in the conventional one-way clutch of roller type, adequate reliability can be maintained.

Further features of the present invention will become apparent from the following description of an exemplary embodiment with reference to the attached drawings.

DETAILED DESCRIPTION OF THE INVENTION

Figure 1:
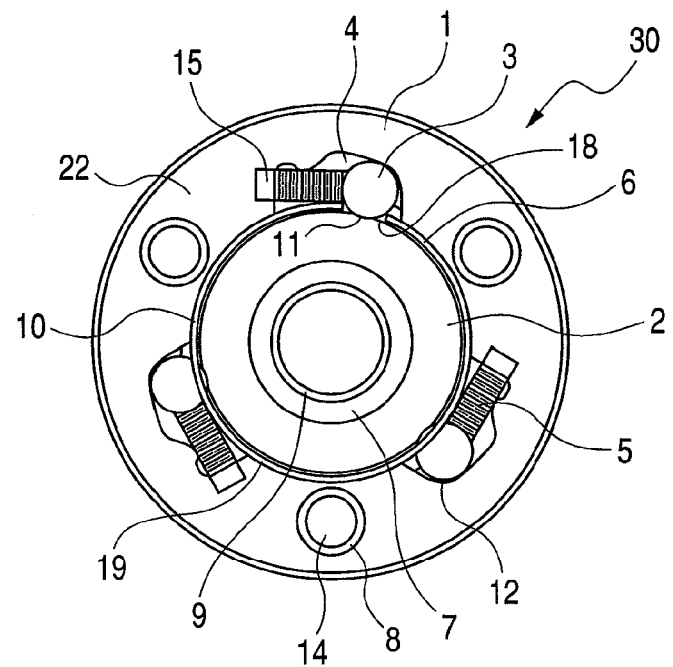
FIG. 1 is a front view showing a one-way clutch of roller type according to an embodiment of the present invention in a condition that the clutch is engaged under a high load.

Now, an embodiment of the present invention will be fully explained with reference to the accompanying drawings. Incidentally, in the drawings, same or similar parts or elements are designated by the same reference numerals. Further, it should be noted that the embodiment which will be described below is merely an example and other alterations and modifications can be made.

Figure 2:
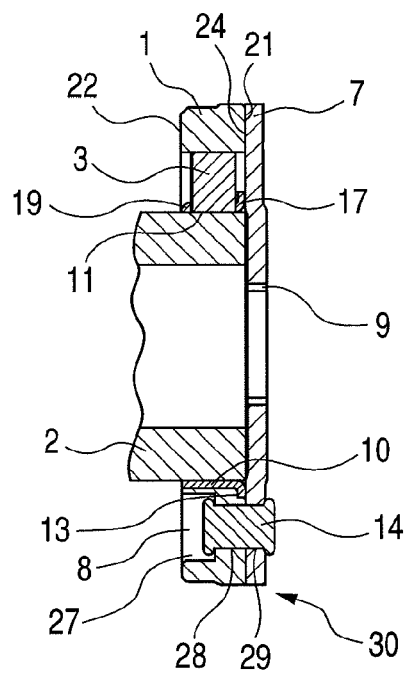
FIG. 2 is a sectional view taken along the line 2-O-2 of FIG. 3.
Figure 3:
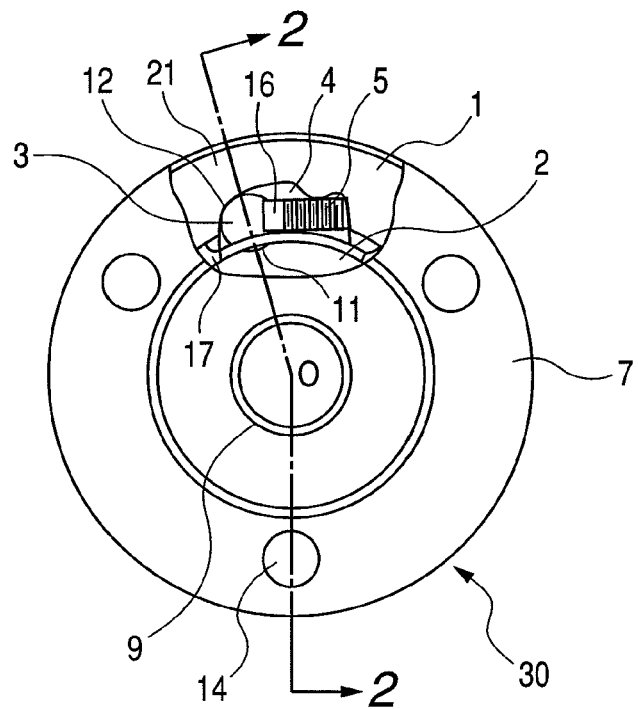
FIG. 3 is a front view looked at from a rear side of FIG. 1.

FIG. 1 is a front view showing a one-way clutch of roller type according to an embodiment of the present invention, and FIG. 3 is a front view looked at from a rear side of FIG. 1. Further, FIG. 2 is a sectional view taken along the line 2-O-2 of FIG. 3.

FIGS. 1 to 3 show a condition that rollers are engaged by cam surfaces, i.e. a condition that the one-way clutch is engaged under a high load and is locked.

As shown in FIGS. 1 to 3, a one-way clutch 30 of roller type comprises an annular outer race 1 provided at its inner periphery with a plurality of pockets 4 formed as recessed portions having cam surfaces 12, an inner race 2 spaced inwardly from the outer race 1 in a radial direction and rotatable relative to the outer race and disposed in concentric with the outer race and having an annular outer peripheral track surface 11, rollers 3 disposed in the respective pockets 4 and adapted to transmit torque between the outer peripheral track surface 11 of the inner race 2 and the inner peripheral cam surfaces 12 of the outer race 1, springs 5 disposed in the respective pockets 4 and adapted to bias the rollers 3 toward engagement directions with respect to the cam surfaces 12, a cage 6 for holding the rollers 3, and a side plate 7 provided at its inner diameter portion with spline grooves 9. The cage 6 is not secured to either the outer race 1 or the inner race 2, and, thus, can be rotated relative to the outer race 1 and the inner race 2.

As shown in FIGS. 2 and 3, the cage 6 for holding the rollers 3 comprises a cylindrical portion 10 and an annular flange portion 17 extending radially outwardly from an axial one end of the cylindrical portion 10. Incidentally, in FIG. 3, the flange portion 17 and the side plate 7 are partially broken so that the pockets 4 can be seen.

Further, the cage 6 has windows 18 the number of which corresponds to the number of rollers 3. The window 18 extends through the cage in the radial direction, but, in the axial direction, both an end of the window near the flange portion 17 and an end 19 remote from the flange portion 17 are closed. The window 18 has a circumferential width smaller than a diameter of the roller 3. That is to say, the roller 3 is seated in a substantially rectangular window 18 encircled at its four sides, thereby preventing the roller 3 from being dislodged in the inner diameter direction. To show a relationship between the window 18 and the roller 3, in FIG. 1, the end 19 of the uppermost window 18 is broken away.

One end i.e. tab 15 of each spring 5 disposed in the pocket 4 is locked to the axial end face 22 of the outer race 1, as shown in FIG. 1, and, the other end i.e. tab 16 of the spring is pinched between an axial end face of the roller 3 and the flange portion 17 of the cage 6, as shown in FIG. 3. That is to say, the spring 5 is arranged between the outer race 1 and the roller 3. With this arrangement, the spring 5 itself is fixedly supported with respect to the outer race 1, with the result that dislodgement of the spring 5 can be prevented and, at the same time, the roller 3 can be prevented from being dislodged in the axial direction.

In the illustrated embodiment, although an accordion spring is used as the spring 5, other type of spring such as a coil spring can be used.

As shown in FIGS. 2 and 3, an annular stepped portion 13 is provided on an inner diameter portion of an axial end face 21 of the outer race 1, and the flange portion 17 of the cage 6 is engaged by the stepped portion 13. By securing the side plate 7 to the outer race 1 so that the flange portion 17 of the cage 6 is engaged by the stepped portion 13, the dislodgement of the cage 6 can be prevented.

An axial depth of the stepped portion 13 is slightly greater than a thickness of the flange portion 17 so that, when the flange portion 17 is engaged by the stepped portion 13, a clearance is generated between the axial end face 21 of the outer race 1 and an axial end face of the flange portion 17. Thus, the cage 6 can be rotated relative to the outer race 1 and the dislodgement of the cage 6 in the axial direction can be prevented.

In the one-way clutch of roller type according to the present invention, as shown in FIGS. 1 to 3, a plurality (three in the illustrated embodiment) of drilled holes 8 extending through the outer race 1 are formed in the outer race, and, at positions corresponding the plurality of drilled holes 8, a plurality (three in the illustrated embodiment) of drilled holes 29 extending through the side plate 7 are formed in the side plate. By abutting the axial end face 21 of the outer race 1 against an axial end face 24 of the side plate, the plurality of drilled holes 8 are concentrically positioned with respect to the plurality of drilled holes 29. In a condition that the drilled holes 8 are concentrically communicated with the drilled holes 29, by inserting rivets 14 into the respective plural drilled holes 8 and the respective plural drilled holes 29 and by caulking the rivets 14, the side plate 7 is strongly secured to the outer race 1. The drilled holes 8 and the drilled holes 29 are arranged with the same pitch in the circumferential direction.

In this way, by fastening the outer race 1 and the side plate 7 to each other by using the rivets 14 in plate of the conventional bolts, reduction in reliability of the one-way clutch due to the looseness of screws can be eliminated, and manufacturing steps such as a step for providing threaded holes, a step for tightening the screws and a step for providing means for preventing the looseness of the screws can be omitted to reduce the number of manufacturing steps, thereby realizing reduction in cost.

In the illustrated embodiment, three pockets 4 provided in the outer race 1 are arranged equidistantly along the circumferential direction. Further, three rivets 14 for fastening the outer race 1 and the side plate 7 to each other are also arranged equidistantly along the circumferential direction, and the rivets 14 and the pockets 4 are disposed equidistantly and alternately. Of course, it should be noted that the number of the pockets 4 can be set to be plural (for example, three to six), in accordance with the magnitude of the torque.

Figure 4:
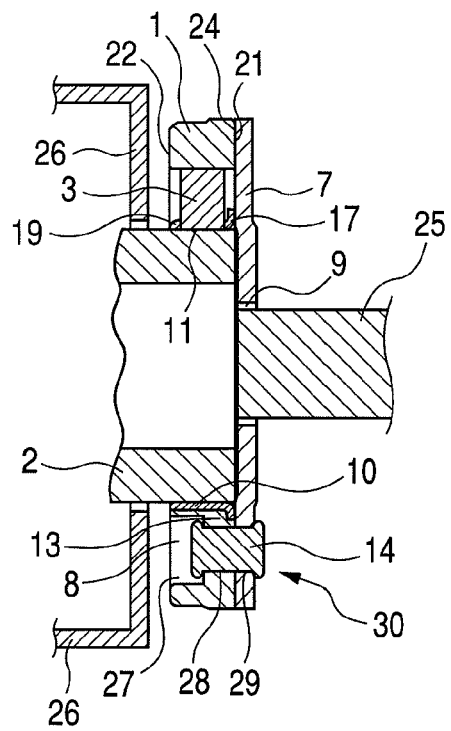
FIG. 4 is a sectional view of the one-way clutch of roller type according to the embedment of the present invention, taken along the line 2-O-2 of FIG. 3, showing a condition that a crankshaft of an engine and a housing of a starter motor are mounted to the clutch.

FIG. 4 is a sectional view of the one-way clutch of roller type according to the embodiment of the present invention taken along the line 2-O-2 of FIG. 3, in a condition that a crankshaft 25 of an engine as an input member and a housing 26 of a starter motor are mounted to the clutch.

The housing 26 as a part of the starter motor is engaged by the inner race 2 and the crankshaft 25 of the engine (not shown) is fitted into the spline grooves 9 provided in the inner diameter portion of the side plate 7.

Accordingly, since the outer race 1 and the side plate 7 are coupled to each other by the rivets 14, a power of the starter motor can be transmitted to the crankshaft 25 of the engine by means of a mechanism comprised of the rollers 3, springs 5 and cam surfaces 12 which operate between the inner race 2 and the outer race 1. When the engine is started and is rotated at a high speed, a rotational speed of the outer race 1 becomes faster than a rotational speed of the inner race 2, with the result that the rollers 3 are shifted from the respective cam surfaces 12, thereby releasing the engagement between the outer race 1 and the inner race 2. Thus, after the engine is started, a driving force of the engine is not transmitted to the starter motor via the inner race 2.

As shown in FIGS. 2 and 4, the drilled hole 8 provided in the outer race 1 includes an opening 27 formed in the axial end face 22 of the outer race 1 and a through hole 28 adjacent to the axial end face 21 of the outer race 1, and a diameter of the opening 27 is greater than a diameter of the through hole 28.

Accordingly, when the rivet 14 is inserted into the drilled hole 8 and the drilled hole 29 and the rivet 14 is caulked, since a deformed portion (caulked portion) of the rivet 14 is accommodated in the large diameter opening 27 not to expose or protrude from the axial end face 22 of the outer race 1, interference such as contact between the rivet and any other members can be prevented.

The one-way clutch of roller type according to the present invention can be used with various articles or devices utilizing a power transmitting mechanism, and, particularly, it can be used with a starter of a motor bike effectively.

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

What is claimed is:

1. A one-way clutch of roller type comprising:
   an outer race provided at its inner periphery with at least one pocket including a cam surface and having a stepped portion formed at an inner diameter side of one axial end face of said outer race and also having a plurality of holes passing through said outer race in an axial direction;
   an inner race spaced apart from said outer race toward a radial inner diameter side of said outer race and coaxially arranged for a relative rotational movement;
   a roller disposed in said pocket and adapted to transmit torque between said outer race and said inner race when engaged by said cam surface;
   a cage rotatable relative to said outer race and having a cylindrical portion with a window for holding said roller and a flange portion extending from said cylindrical portion in an outer diameter direction and fitted into said stepped portion of said outer race;
   a spring disposed in said pocket and adapted to bias said roller toward an engagement direction with respect to said cam surface; and
   a side plate provided at its inner diameter portion with spline grooves with which an input member is engaged and having a plurality of holes extending through said side plate in the axial direction and arranged at the same pitch as said holes of said outer race,
   wherein said side plate is secured to said outer race by inserting rivets into said holes of said outer race and said holes of said side plate and by caulking said rivets.

2. A one-way clutch of roller type according to claim 1, wherein said side plate is secured to an axial one end face of said outer race, and the other axial end face of said outer race is provided with openings disposed coaxially with said holes of said outer race and having diameters greater than diameters of said holes of said outer race, and caulked portions of said rivets generated by the caulking are accommodated in said respective openings.

3. A one-way clutch of roller type according to claim 1, wherein said one-way clutch is used as a starter of a motor bike.

4. A one-way clutch of roller type according to claim 1, wherein said window has a circumferential width smaller than a diameter of said roller.

5. A one-way clutch of roller type according to claim 1, wherein said spring is arranged between said outer race and said roller.

6. A one-way clutch of roller type according to claim 1, wherein said input member is a member associated with an engine.

* * * * *